United States Patent
Kuroda et al.

(10) Patent No.: US 7,061,424 B2
(45) Date of Patent: Jun. 13, 2006

(54) RADAR DEVICE

(75) Inventors: Hiroshi Kuroda, Hitachi (JP); Kazuaki Takano, Hitachinaka (JP); Fumihiko Okai, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/501,709

(22) PCT Filed: Jan. 18, 2002

(86) PCT No.: PCT/JP02/00317

§ 371 (c)(1),
(2), (4) Date: Jul. 16, 2004

(87) PCT Pub. No.: WO03/062852

PCT Pub. Date: Jul. 31, 2003

(65) Prior Publication Data

US 2005/0017891 A1    Jan. 27, 2005

(51) Int. Cl.
  *G01S 13/93* (2006.01)
  *G01S 13/34* (2006.01)
(52) U.S. Cl. .................. 342/70; 342/118; 342/128; 342/165; 342/173; 342/175; 342/195; 342/196
(58) Field of Classification Search .............. 342/27, 342/28, 70–72, 118, 128–133, 175, 192–197, 342/165–174; 180/167–169; 701/300, 301
See application file for complete search history.

(56) References Cited

U.S. PATENT DOCUMENTS 3,749,197 A * 7/1973 Deutsch ............... 180/169
3,778,823 A * 12/1973 Sato et al. ............ 342/72
5,684,490 A * 11/1997 Young et al. ......... 342/70
5,731,779 A    3/1998 Kikuchi
6,005,511 A * 12/1999 Young et al. ......... 342/70
6,020,844 A    2/2000 Bai et al.
6,026,353 A    2/2000 Winner (Continued)

FOREIGN PATENT DOCUMENTS

JP    20026032 A    1/2000

(Continued)

OTHER PUBLICATIONS

Original Japanese text and English translation of K. Fujimura, "Current Status and Trends of mm-Wave Automotive Radar", Journal of IEICE, pp. 977-981 (Oct. 1996).

*Primary Examiner*—Bernarr E. Gregory
(74) *Attorney, Agent, or Firm*—Crowell & Moring LLP

(57) ABSTRACT

The present invention provides a radar device mounted on a moving object that moves along a continuous plane, having (1) a transceiver part for transmitting a signal having a main lobe in the direction of the movement of the moving object and a side lobe directed towards the continuous plane, that receives a first reflection signal from a target in the direction of the main lobe and a second reflection signal from the continuous plane in the direction of the side lobe, and (2) control processing means for detecting the frequency of a beat signal of the second reflection signal received by the transceiver part and the signal emitted by the transceiver part and for detecting information correlated to the attitude of the radar device with respect to the continuous plane based on that frequency. This enables detection of changes of mounting attitude for the moving object without requiring additional hardware.

6 Claims, 11 Drawing Sheets

U.S. PATENT DOCUMENTS

| | | | |
|---|---|---|---|
| 6,043,772 A * | 3/2000 | Voigtlaender et al. | 342/70 |
| 6,061,001 A * | 5/2000 | Sugimoto | 180/169 |
| 6,157,294 A | 12/2000 | Urai et al. | |
| 2002/0189875 A1 | 12/2002 | Asanuma et al. | |

FOREIGN PATENT DOCUMENTS

| | | |
|---|---|---|
| JP | 2002006032 | 1/2002 |
| JP | 200056020 | 2/2002 |

* cited by examiner

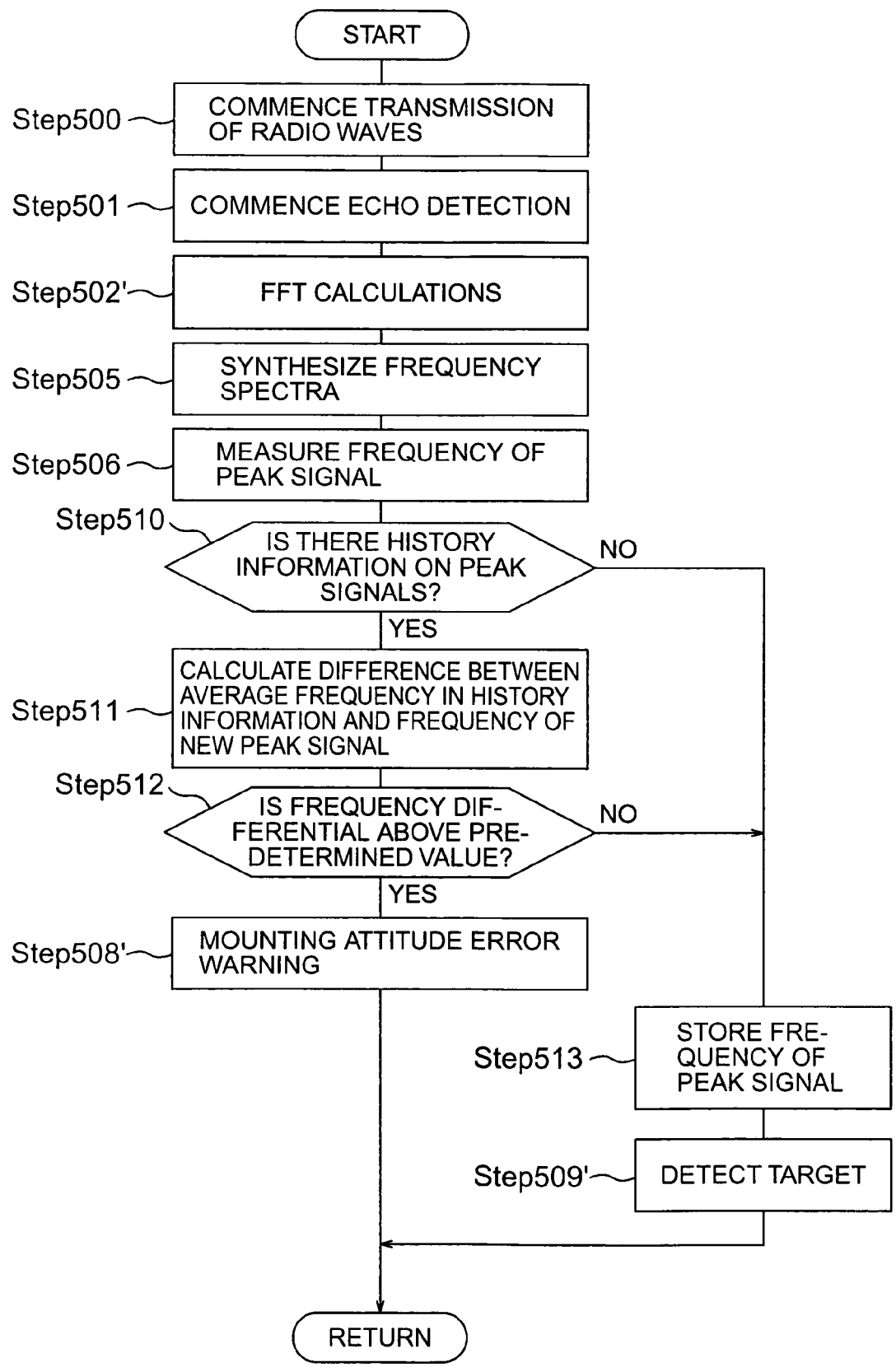

RADAR DEVICE

BACKGROUND OF THE INVENTION

This application claims the priority of International Application No. PCT/JP02/00317, filed Jan. 18, 2002, the disclosure of which is expressly incorporated by reference herein.

The present invention relates to a radar that detects the existence of a target by transmitting radio waves and receiving the waves reflected from the target.

Radio radars are employed in a variety of fields for measuring the distance to a target. For example, in the automobile manufacturing industry, development is proceeding on radar for vehicle loading that measures the distance between a forward vehicle and another vehicle.

Such radar are classified into a variety of forms depending on the waveform of the radio waves used. In an article entitled "Current Status and Trends of mm-Wave Automobile Radar", on pages 977–981 of the October, 1996 edition, Journal of the Institute of Electronic Information and Communication Engineers for example, a variety of forms of radar are mentioned, including pulse radar, FSK (Frequency Shift Keying) CW (Continuous Wave) radar and FMCW (Frequency Modulated Continuous Wave) radar. A pulse radar is a wireless device that emits pulse waves and detects the distance to a target based on the time that elapses until the echo waves are received. The FSK is a wireless device that emits each of two different continuous wave alternatively, based on a Doppler-shift of each echo thereof, and detects the distance to a target object and the relative speed of the target object. An FMCW radar is a wireless device that emits continuous waves of a suitable repeating frequency modulation, such as a triangular wave frequency modulation or the like, and detects the distance to a target object and the relative speed of the target object based on the beat frequency of the transmitted signals and the reflected signals. Among such radar, FSK CW and FMCW radars detect the distance to and relative speed of a target based on the phase and frequency of peak signals of a frequency spectral obtained by FFT (Fast Fourier Transform) processes applied to signals received at a reception antenna.

First, a vehicle mounted radar is mounted on the vehicle mainly for the purpose of detecting a target (such as a vehicle in front) that exists on the surface of the road, therefore the radar may not erroneously detect a pedestrian bridge positioned over the road for example, as the target. Thus, the radar must maintain an attitude when in the condition of being mounted on the vehicle, enabling radio waves to be transmitted to the planar direction of the road surface and radio waves to be received from the planar direction of the road surface. The technology disclosed in JP-A-2000-56020 is well know in connection with such radars. This technology provides two electromagnetic wave emitting sources for emitting electromagnetic waves in slightly vertically inclined directions for the forward direction of a vehicle, mounted on an object detection apparatus, with changes in the attitude of the object detection apparatus being detected by comparing the strength of reflected waves of the electromagnetic waves from each electromagnetic wave emitting source. JP-A-2000-56020 cites laser rays and milliwaves as examples of the electromagnetic waves.

SUMMARY OF THE INVENTION

It is an object of the present invention to provide a radar device that can detect variation in the mounting attitude for a moving object, without adding any hardware. To achieve this objective the present invention provides a radar device mounted on a moving object that moves along a continuous plane, having (1) a transceiver part that transmits a signal having a main lobe in the direction of the movement of the moving object and a side lobe directed towards the continuous plane, and that receives a first reflection signal from a target in the direction of the main lobe and a second reflection signal from the continuous plane in the direction of the side lobe, and (2) control processing means which detects the frequency of a beat signal of the second reflection signal received by the transceiver part and the signal emitted by the transceiver part, and that detects information correlated to the attitude of the radar device with respect to the continuous plane based on that frequency.

As much freedom as possible is maintained in the combination of parts included in the concrete structure proposed for the best embodiment for implementing the present invention, the present invention comprising any such combination. For example an embodiment obtained by appropriately eliminating a part of the structure proposed for the best embodiment for implementing the present invention may still provide an embodiment of this invention.

BRIEF DESCRIPTION OF THE DRAWINGS

FIG. 14 is a flowchart depicting the processes executed by a microcomputer related to a first embodiment of the present invention.

DETAILED DESCRIPTION OF THE DRAWINGS

The embodiments of the present invention will now be described with reference to the drawings.

This description begins with an explanation of the theory behind the detection of the mounting attitude of a radar for mounted on a moving object.

Figure 1:
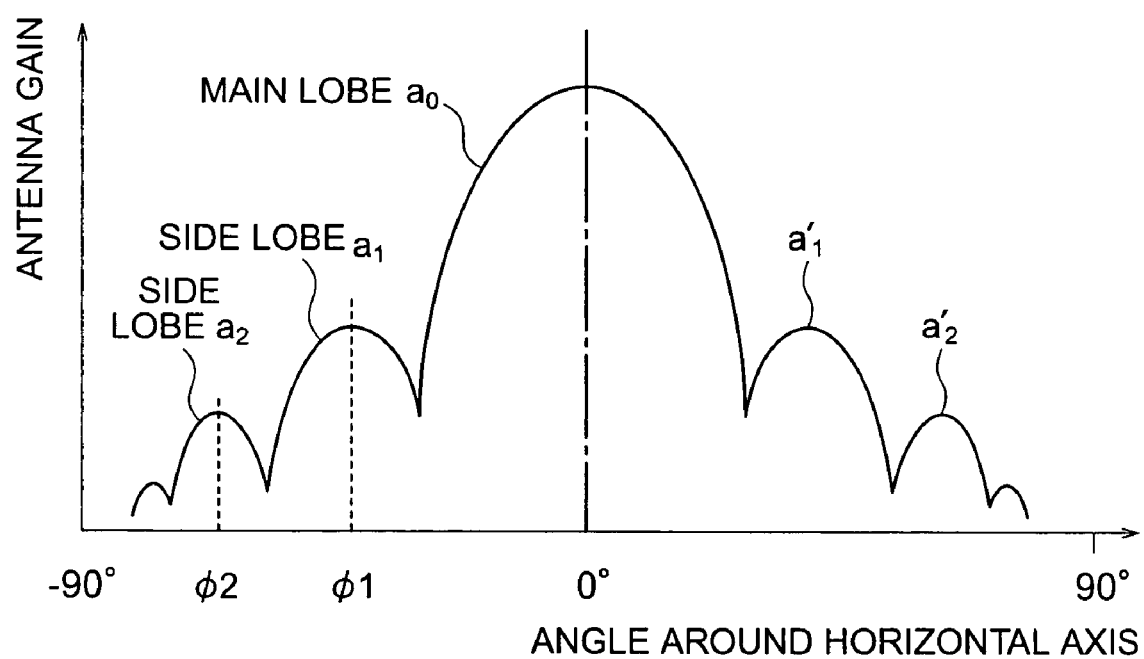
FIG. 1 shows antenna characteristics obtained by synthesis of antenna gain of a reception antenna and a transmission antenna of a radar related to a first embodiment of the present invention.
Figure 2:
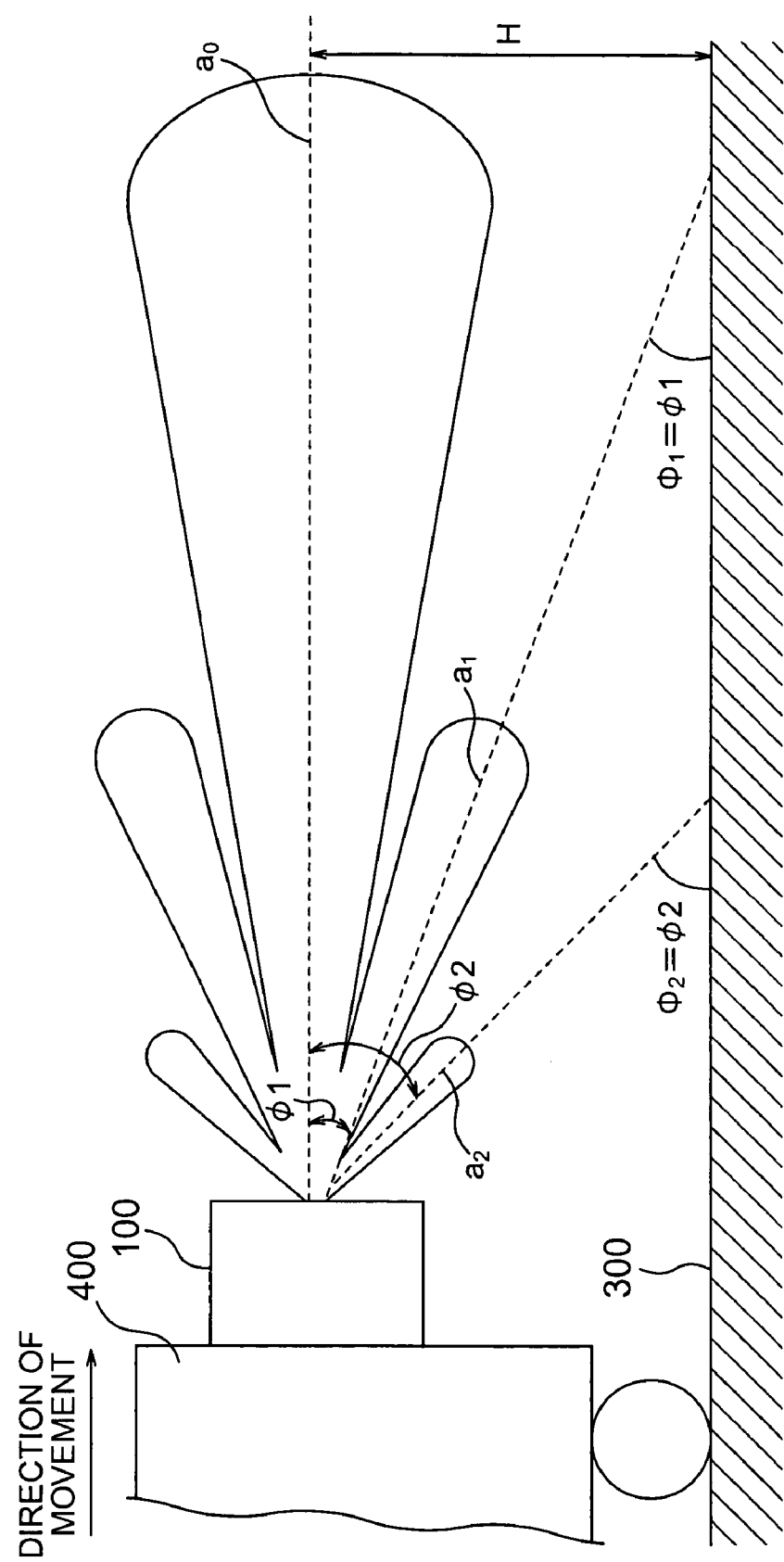
FIG. 2 shows an antenna pattern illustrating a theory for detecting the mounting attitude of a radar for a moving object.
Figure 3:
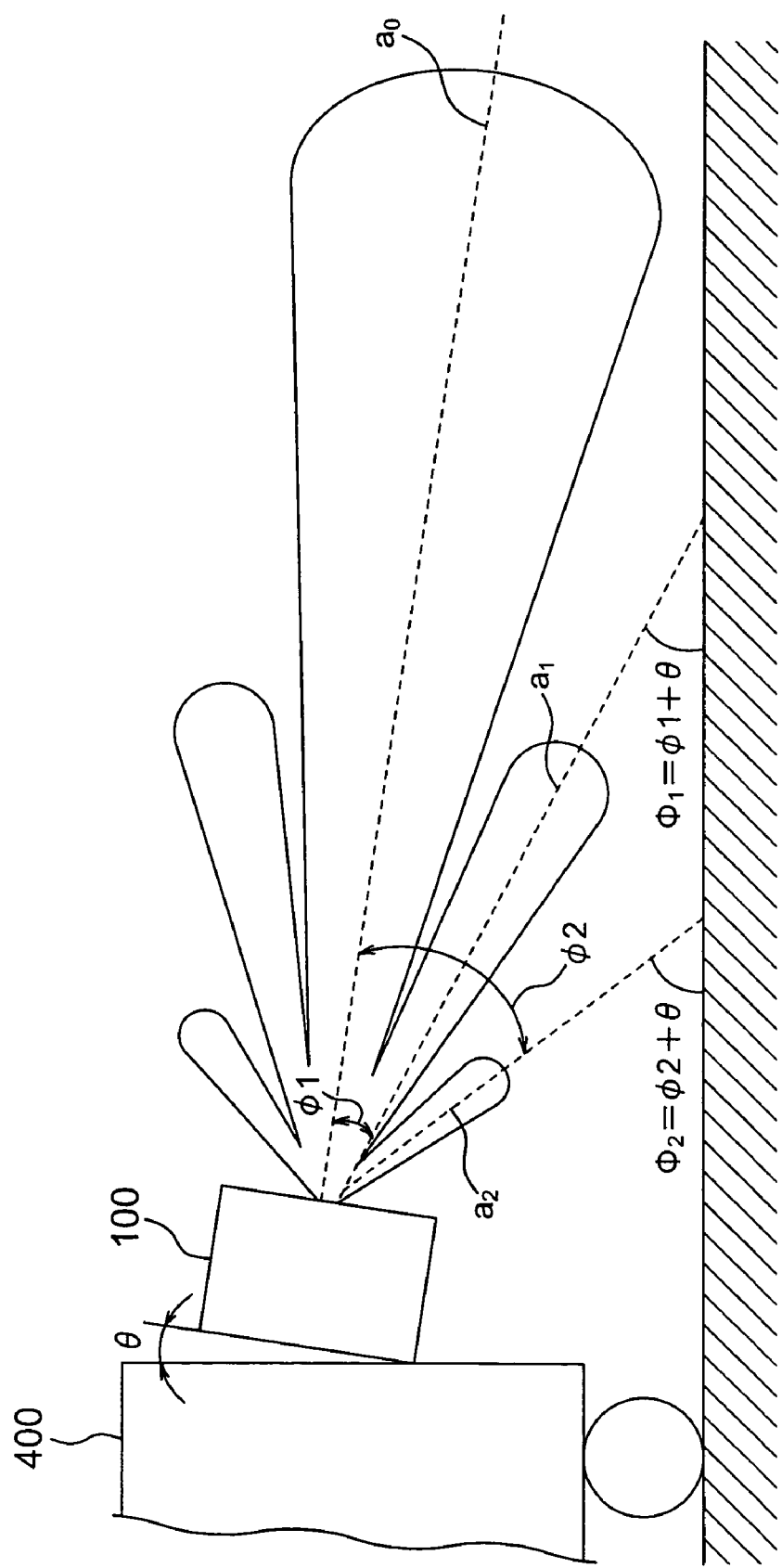
FIG. 3 shows an antenna pattern illustrating a theory for detecting the mounting attitude of a radar for a moving object.

As shown in FIG. 1, normally, a radar antenna is designed having a radiation pattern of radio waves in which a series of side lobes a1, a2, . . . , a1', a2' and . . . , continuing from a main lobe a0 are represented as radiation within a range of angles of ±90° extending from the main lobe a0. Accordingly, as shown in FIG. 2, if a radar 100 is mounted on a moving object 400 moving on a level surface 300 such that the main lobe a0 of the antenna and that moving object are parallel, the angles Φ1, Φ2, . . . , formed between the surface 300 and the side lobes a1, a2, . . . , that are a part of the side lobes a1, a2, . . . , a1', a2', . . . of the antenna, may theoretically be equivalent to the angles ø1, ø2, . . . of the main lobe a0. Hereinafter this mounting attitude of a radar on a moving object is taken as the standard attitude. Here, if a variation arises in this mounting attitude of the radar 100 on the moving object 400 a variation correlated thereto arises in the angle between the surface 300 and the side lobes a1, a2, . . . of the antenna. As shown in FIG. 3 for example, if the mounting attitude of the radar 100 on the moving object is rotated at an angle θ from the standard attitude around a straight axis horizontal to the forward direction of movement of the vehicle on which the radar is mounted, the angles Φ1, Φ2, . . . between the surface 300 and the side lobes a1, a2, . . . of the antenna may theoretically increase at an angle equivalent to that angle of rotation 0 of the radar.

In this way, the angle between the surface and the side lobes of the antenna varies in correlation to the angle of the rotation of the radar around a straight axis horizontal to the direction of movement of the vehicle on which the radar is mounted. According to this embodiment of the present invention, the angles Φ1, Φ2, . . . formed between the surface 300 and the side lobes a1, a2, . . . of the antenna are detected and the variation in the mounting attitude of the radar on the moving object is estimated based on the detected results. The method for calculating the angles Φ1, Φ2, . . . formed between the surface 300 and the side lobes a1, a2, . . . of the antenna differs for the modulation system of the radar. Concrete examples of this follow.

The angles Φ1, Φ2, . . . formed between the surface 300 and the side lobes a1, a2, . . . of the antenna for a FSK CW radar for example, can be calculated in the following way.

If an object exists in the region of radio waves radiation from the antenna of a radar the antenna receives an echo from that object. This echo is subject to the Doppler effect due to the relative movement between the radar and the object. Accordingly, the frequency of this echo shifts only the Doppler frequency f provided by expression (1) from the emitted frequency fc of the radio waves from the antenna.

$$f = 2 \cdot fc \cdot v/c \quad (1)$$

Here, c is the speed of light and v is the relative speed of the radar and the object.

If static objects exist in the directions of each of the side lobes a1, a2, . . . of the antenna of a radar moving at speed V the relative speeds of each of those static objects and the radar are V·cos Φ1, V·cos Φ2. Accordingly if the Doppler frequencies f1, f2, . . . of the echo received from each of the static objects by the antenna of the radar are obtained from expression (1), expression (2) is obtained.

$$fk = 2 \cdot fc \cdot V \cdot \cos \Phi k/c (k=1, 2, \ldots) \quad (2)$$

If the surface existing in the directions of each of the side lobes a1, a2, . . . of the antenna when the radar is mounted on the moving object moving over that surface at speed V is considered to be a static object and the Doppler frequencies f1, f2, . . . of the echoes from the surface are detected using FFT processes, the angles Φ1, Φ2, . . . between the surface 300 and the side lobes a1, a2, . . . of the antenna can be obtained by substituting those detected values f1, f2, . . . in expression (2).

Further, the angles Φ1, Φ2, . . . formed between the surface 300 and the side lobes a1, a2, . . . of the antenna for an FMCW radar for example, can be calculated in the following way.

The Range, being the distance from a radar to an object existing in the region of radiation of radio waves from the antenna of the radar, can be obtained by expression (3).

$$\text{Range} = c \cdot (fb + + fb -)/(8 \cdot \Delta F \cdot fm) \quad (3)$$

Here, c is the speed of light, fb++fb− is the sum of values fb+, fb− (refer to FIG. 11) alternately shown by frequencies of the beat signal of the echo from the object, fm indicates the cycles of repetition of transmission of radio waves (refer to FIG. 10) from the transmission antenna, ΔF is the bandwidth of the frequency deviation of radio waves transmitted from the transmission antenna and λ is the wavelength of radio waves from the transmission antenna.

If the surface existing in the directions of each of the side lobes a1, a2, . . . of the radar antenna is considered a static object, the distance (R1, R2, . . . in FIGS. 2 and 3) between the radar and the position at which each of the side lobes a1, a2, . . . from the radar antenna reach the surface can also be obtained by the Range of expression (3). If the distance (R1, R2, . . . of FIGS. 2 and 3) between the radar and the position at which each of the side lobes a1, a2, . . . from the radar antenna reach the surface are geometrically calculated expression (4) is obtained.

$$Rk = H/\sin \Phi k (k=1, 2, \ldots) \quad (4)$$

Here, H represents the distance (H of FIG. 2) between the surface and the main lobe a0 of the antenna of the radar maintaining the standard attitude.

Substituting distance Rk obtained from expression (4) for the Range of FIG. (3) produces expression (5).

$$H/\sin \Phi k = c \cdot (fb + + fb -)/(8 \cdot \Delta F \cdot fm)(k=1, 2, \ldots) \quad (5)$$

Detecting the frequencies fb+, fb− shown alternately by the beat signal of the echo from the surface for each side lobe using FFT processes and substituting those detected values fb+, fb− in expression (5) enables the angles Φ1, Φ2, . . . formed between the surface 300 and each of the side lobes a1, a2, . . . of the antenna to be obtained.

A structure for a radar system capable of estimating the mounting attitude of the radar on a moving object using the above principles will now be described. Here, a homodyne type FSK CW radar is described to provide an example of a radar of this radar system, however this does not preclude usage of a heterodyne system FSK CW radar.

Figure 4:
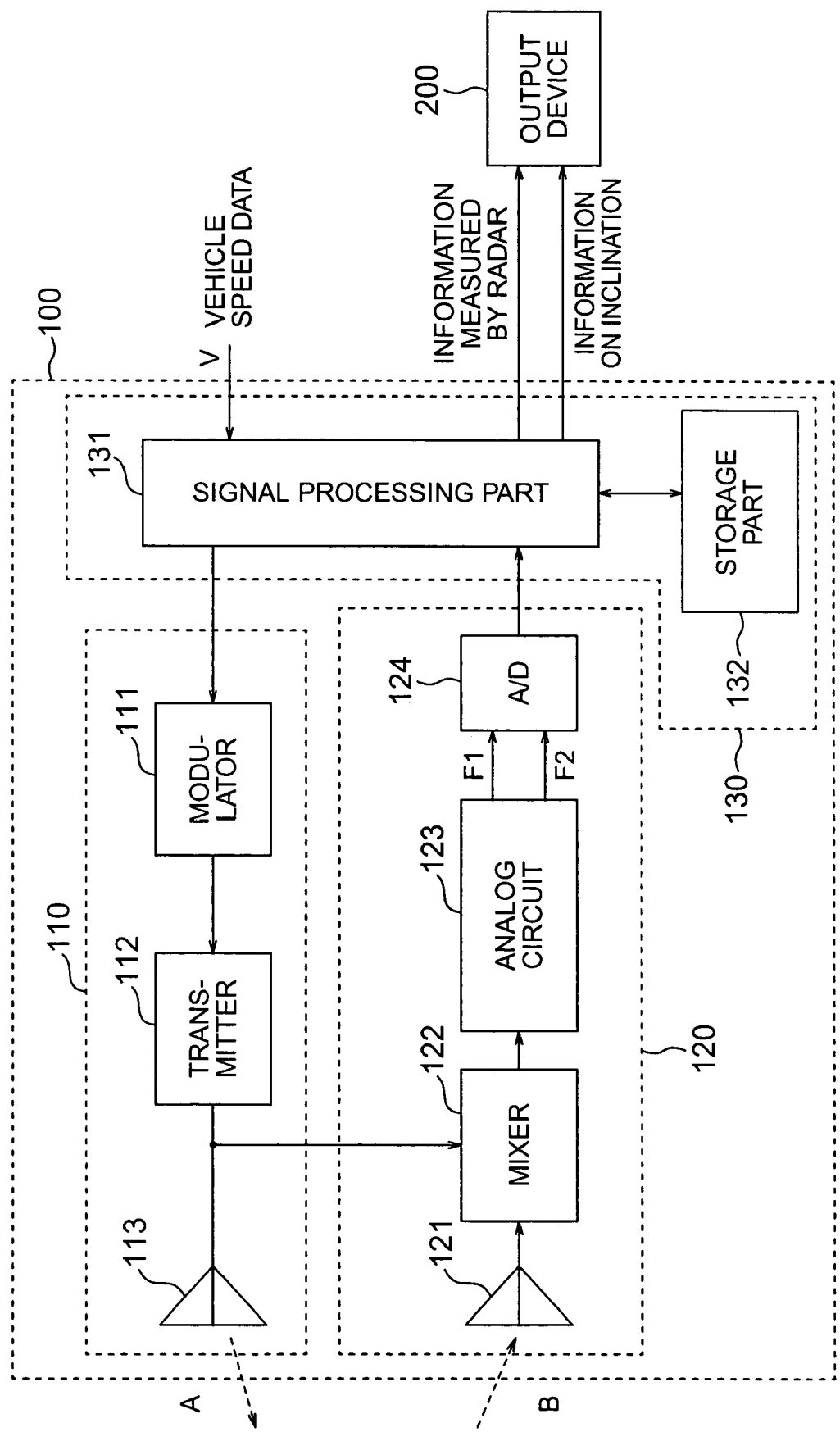
FIG. 4 schematically depicts a radar system related to a first embodiment of the present invention.

As shown in FIG. 4 a radar system according to this embodiment has a FSK CW radar 100 for successively receiving input of vehicle speed data V from an existing vehicle speed sensor (not shown in the drawing) of a vehicle and an output device 200 (such as a liquid crystal display, speakers or the like), for outputting information of the FSK CW radar 100, including measured information on a target and information on the inclination of the FSK CW radar 100 for the radar mounted vehicle.

The FSK CW radar 100 has a transceiver part including a transmitting part 110 for emitting radio waves A in the forward direction of the radar mounted vehicle and a receiving part 120 for receiving echoes B from objects (a target, the track of the radar mounted vehicle) in the forward direction of the radar mounted vehicle and a control processing part 130 for detecting an object in the forward direction of the radar mounted vehicle from output from the receiving part 120 as well as a housing (refer to FIG. 5) accommodating these parts.

The transmitting part 110 has a modulator 111 for alternately outputting two types of modulated signal in response to switchover instructions from the control processing part 130, a transmitter 112 for outputting high frequency signals (e.g. milliwaves) of frequencies f1 and f2 emitted in correlation to the modulated signal's from the modulator 111, a transmitting antenna 113 for transmitting output signals from the transmitter 112 as radio waves A and a directionality coupler 114 for guiding a part of the output from the transmitter 112 to the receiving part 120 as a standard signal of frequency conversion to an intermediate frequency band. In this configuration the transmitting part 110 causes continuous waves A having mutually differing transmission frequencies to be alternately emitted from the transmitting antenna 113 in the forward direction of the radar mounted vehicle.

The receiving part 120 has a receiving antenna 121 for receiving an echo B from an object in the forward direction of the radar mounted vehicle, a mixer 122 for generating a beat signal for each transmitted frequency f1 and f2 of the radio waves A by mixing signals from the directionality coupler 114 and output signals from the receiving antenna 121, analog circuit 123 for amplifying and demodulating output signals of the mixer 122 for each of the transmitted frequencies f1 and f2 of the radio waves A, and an A/D converter 124 for sampling analog signals F1 and F2 output from the analog circuit 123 for each transmitted frequency f1 and f2 of the radio waves A at suitable sampling intervals.

In this configuration the receiving part 120 detects echoes B from an object in the forward direction of the radar mounted vehicle after amplification of the transmitted frequencies f1 and f2 of the radio waves A.

Process control part 130 has a microcomputer connected to the output device 200. By executing a program, this microcomputer runs a signal processing part 131 and a storage part 132 as functional configuration parts. The signal processing part 131 instructs the modulator 111 and the analog circuit 123 on the timing of the switchover between the two transmitted frequencies f1 and f2 and detects information on measurements concerning the target (the distance from the radar 100 to the target, the relative speeds of the radar 100 and the target) and information on the inclination of the two frequency radar 100 from the reception part 120, before outputting this information to the output device 200. Further, the storage part 132 stores in advance, fixed value data groups required by the signal processing part 131 for the detection of information on the inclination of the two frequency radar 100 (low speed detection threshold values, two threshold values for the detection of the two side lobes and two threshold values for detecting mounting attitude error) and stores frequency spectra obtained by the 131 as history information.

Figure 5:
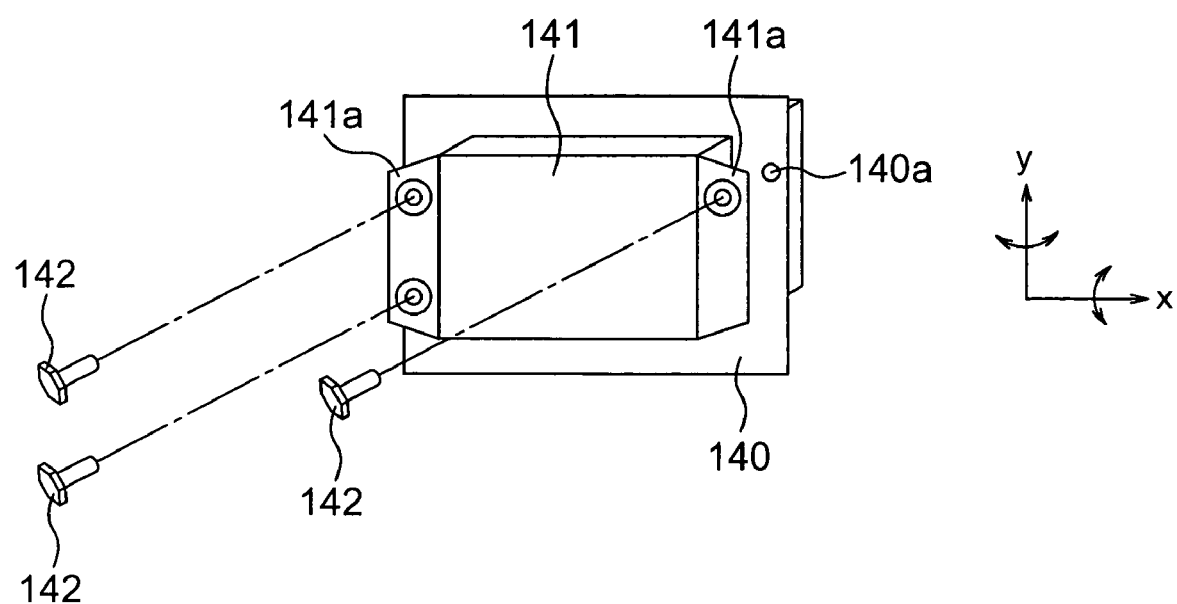
FIG. 5 illustrates the structure of the housing for a radar related to a first embodiment of the present invention.

As shown in FIG. 5, the housing has two guards with through holes 141a disposed on opposite sides of the housing, a securing member (not shown in the drawing) for securing the housing 141 to a holding bracket 140 secured to the front part of the radar mounted vehicle and a plurality of tightening bolts 142 that engage the corresponding tightening screw holes 140a of the holding bracket 140 when the adjusting bolts 142 are inserted in each of the through holes of the two guards 141a. This housing being so configured, a user can adjust the interval between the housing 141 and the bracket 140 through a plurality of positions by adjusting the degree of tightening of each of the adjusting bolts 142, thereby enabling the user to adjust the attitude of the housing 141 for the holding bracket 140, in other words to adjust the mounting attitude of the radar for the radar mounted vehicle. The cover 141 may be secured at three points by the group of adjusting screws 142 to enable the inclination of the cover 141 to be corrected around the x-axis and the y-axis, however this is not essential. For example the cover 141 can be secured in position by the group of adjusting screws 142 in four or more points to enable fine adjustment of the inclination of the cover 141. Further, the cover 141 can be secured in position by the group of adjusting screws 142 along two points above the central axis of the cover following in the direction of the y-axis, to mitigate the effects of the inclination of the cover 141 around the y-access on results measured.

The processes executed by the microcomputer of the radar 100, that is to say, the processes run by each functioning processing part as realized by the execution of software by the microcomputer, will now be described including an explanation of the processes of adjustment performed by the user. Here, the focus will be on the strong first side lobe a1 and second side lobe a2 from among the series of side lobes a1, a2, . . . on the side of the road surface.

Figure 6:
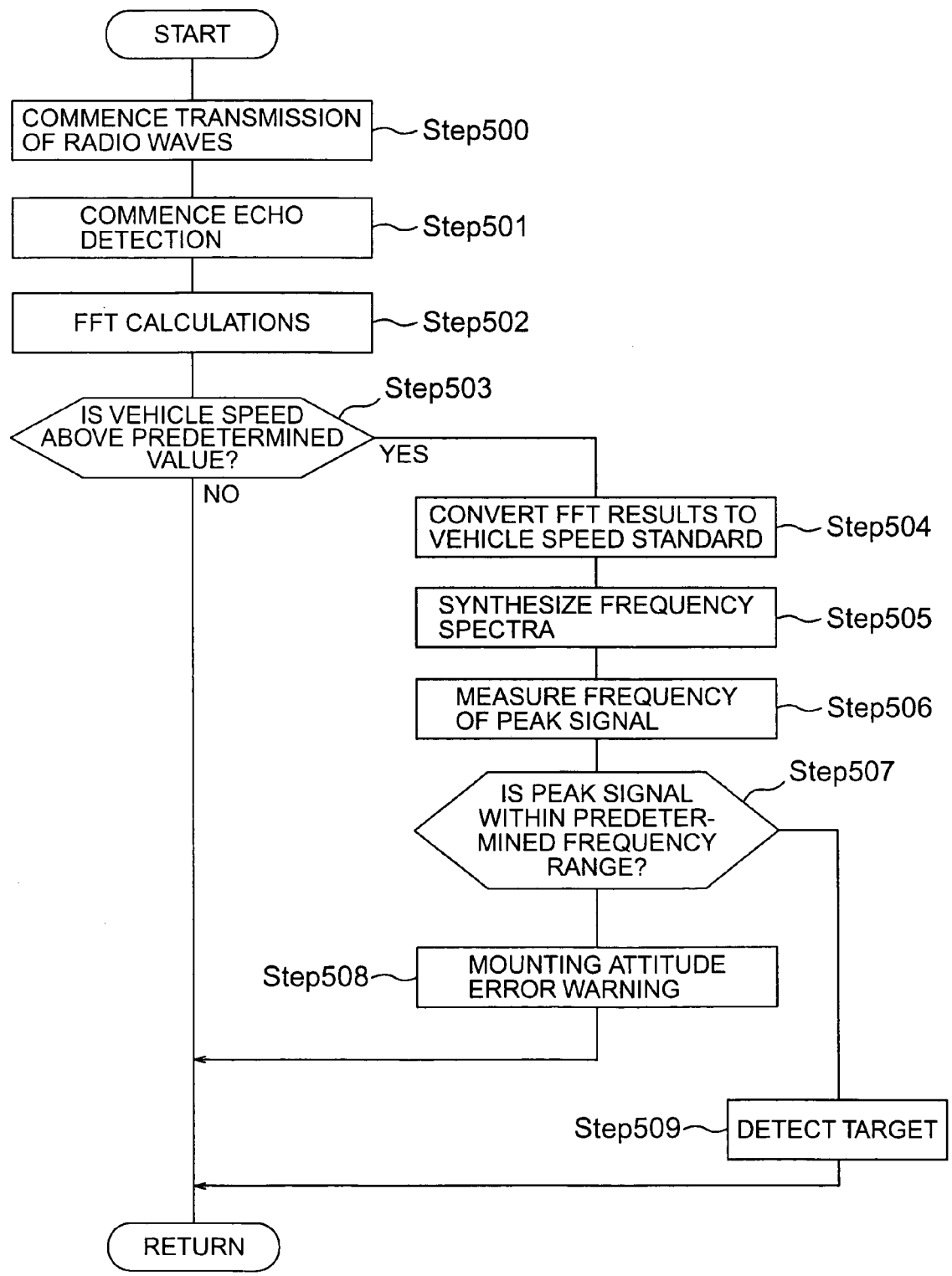
FIG. 6 is a flowchart depicting the processes executed by a microcomputer related to a first embodiment of the present invention.

FIG. 6 is a flowchart depicting the processes executed by the microcomputer of the radar 100.

As the signal control part 131 of the control processing part 130 commences instructions on the timing of the switchover between the two transmitted frequencies f1 and f2, the instructions for the timing of the switchover between these two transmitted frequencies are perceived alternately and cyclically by the modulator 111 of the transmitting part 110 and the analog circuit 123 of the receiving part 120 respectively. Thereafter, radio waves from each of the transmitted frequencies f1 and f2 are alternately and cyclically emitted from the transmitting antenna 113 of the transmitting part 110 (Step 500) and the receiving part 120 commences detecting echoes from an object existing within the range of the radiation of these radio waves (Step 501).

When the receiving part 120 detects an echo from an object within the range of radiation of radio waves A, the signal processing part 131 of the control processing part 130 decomposes into the frequency components of a sample signal from the receiving part 120 using Fast Fourier Transformation (FFT) processes on the respective transmitted frequencies f1 and f2 (Step 502).

The signal processing part 131 of the control processing part 130 then reads the low speed detection threshold value from the storage part 132 and compares this value with vehicle speed data V from the vehicle speed sensor (Step 503).

When the results indicate that this vehicle speed data V from the vehicle speed sensor is less than the low speed detection threshold value, the signal processing part 131 of the control processing part 130 returns to execute the processes of Step 502, and implements FFT processes on new sample signals from the receiving part 120. Here, the reason that signal processing part 131 returns to implement Step 502 if the vehicle speed data V from the vehicle sensor is below the low speed detection threshold value is that when the radar mounted vehicle is traveling at low speed it is unlikely that information on the inclination of the radar 100 will be accurately detected.

When on the other hand the vehicle speed data V from the vehicle speed sensor is above the low speed detection threshold value, the signal processing part 131 of the control processing part 130 implements the following processes to assess the relative attitude of the radar 100 for the radar mounted vehicle.

Figure 7:
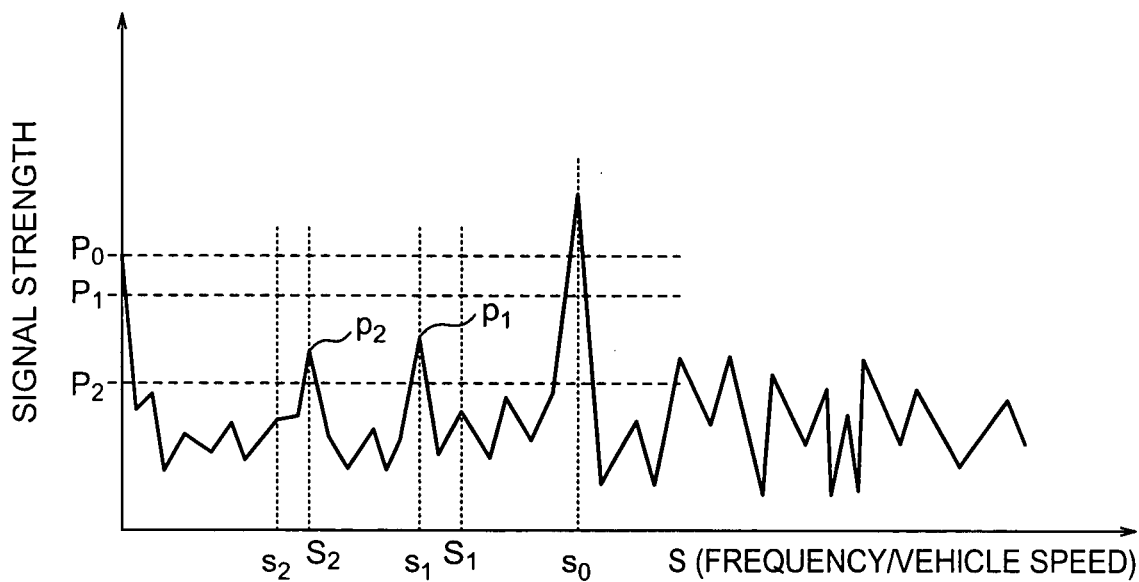
FIG. 7 depicts a frequency spectral generated by FFT.
Figure 8:
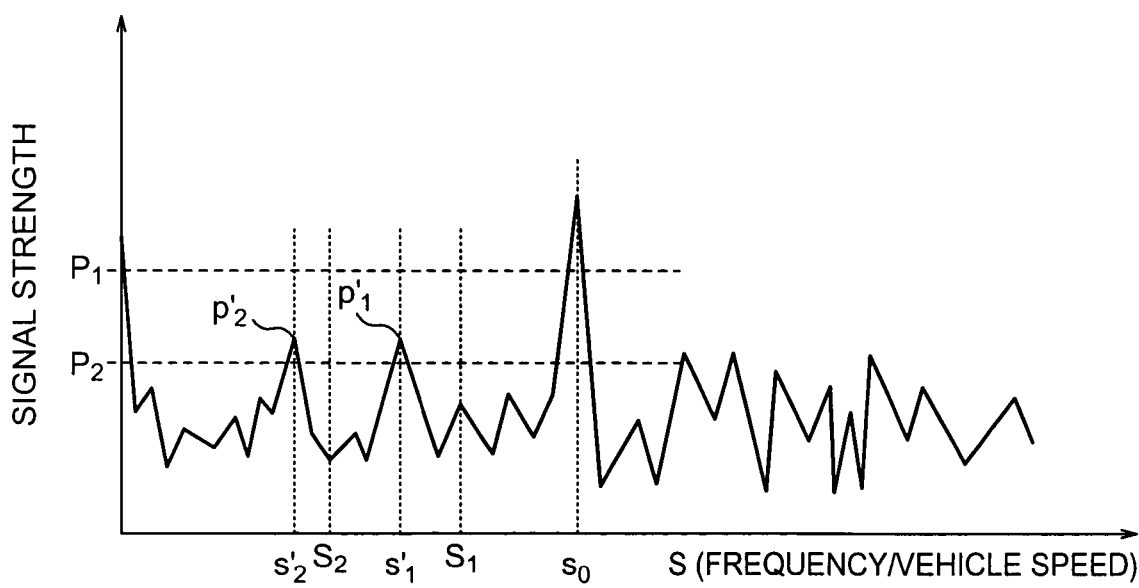
FIG. 8 depicts a frequency spectral generated by FFT.

Firstly, the signal processing part 131 of the control processing part 130 makes the frequency of the frequency spectral obtained at Step 502 dimensionless by dividing by the vehicle speed data V from the vehicle speed sensor (Step 504). The signal processing part 131 of the control processing part 130 then stores the frequency spectral data the frequency of which has been made dimensionless in the storage part 132 as history information, synthesizes frequency spectral data stored within a prescribed time (e.g. for one minute) from the present from among the frequency spectral data groups stored as history information in the storage part 132 and divides that synthesized data by the number of synthesized data (Step 505). In this way, as shown in FIG. 7, the frequency spectra are obtained in which peak signals p1 and p2 arise in the positions of the frequencies s1 and s2 established by the design values ø1 and ø2 of the angles Φ1 and Φ2 formed by the main lobe a0 and each of the side lobes a1 and a2. In contrast to this, if the radar 100 rotates from the standard attitude around a straight axis horizontal to the forward direction of the radar mounted vehicle, as shown in FIG. 8, the frequency spectral is obtained in which peak signals p1' and p2' arise in the positions of the frequencies s1' and s2' established by the sum of the angle of rotation θ of the radar 100 and the design values ø1 and ø2 of the angles Φ1 and Φ2 formed by the main lobe a0 and each of the side lobes a1 and a2.

The signal processing part 131 of the control processing part 130 reads the threshold values P1 and P2 (P1>P2) for detecting the two side lobes from the storage part 132, and detects the peak signal existing between these two side lobe detection threshold values (above P2 below P1) from the frequency spectral obtained at Step 505 (Step 506). Peak signal groups including peak signals corresponding to each of the side lobes a1 and a2 are detected in this way.

Thereafter, the signal processing part 131 of the control processing part 130 reads the two threshold values for detecting mounting attitude error S1 and S2 (S1>S2) and decides whether or not the same number of peak signal frequencies exist in the frequency region (above S2 below S1) between these two threshold values for detecting mounting attitude error, as the number of side lobes a1 and a2 (Step 507). If the detected results indicate that the same number of peak signals (2) exist between the two threshold values for detecting mounting attitude error as the number of side lobes a1 and a2 (2), it can be assumed that the radar 100 is maintaining the standard attitude for the radar mounted vehicle.

Thus, when the number of peak signals existing between the two threshold values for detecting mounting attitude error (above S2 below S1) is the same as the number of side lobes a1 and a2, that is to say, when the radar 100 is maintaining the standard attitude for the radar mounted vehicle, the signal processing part 131 of the control processing part 130 calculates information measured concerning the target from the phase difference and the peak signal frequency (Doppler frequency) correlated to the main lobe and outputs that information to the output device 200. Practically, it reads the target detection threshold P3 from the storage part 132, detects the peak signal (peak signal P0 in FIG. 7) above the target detection threshold P3 for each transmitted frequency, and calculates information on measurements concerning the relative speeds, Rate, of the radar 100 and the target and the distance, Range, from the radar 100 to the target, from the phase difference and the frequency of the peak signals P0 (Step 509). Here, the expressions (6) and (7) are used for calculating this information measured concerning the target.

$$\text{Range} = c \cdot \Delta\varnothing / \{4 \cdot \pi \cdot \Delta f\} \quad (6)$$

$$\text{Rate} = c \cdot fd / (2 \cdot fc) \quad (7)$$

Here, c is the speed of light, Δø is the phase difference (ø1−ø2) of the peak signals of the frequency spectral obtained for each transmitted frequency f1 and f2, Δf is the difference (f1−f2) between the transmitted frequencies f1 and f2, fd is the average value (fd1+fd2)/2 of the frequencies fd1 and fd2 of the peak signals of each frequency spectral obtained for each transmitted frequency f1 and f2 and fc is the average value (f1+f2)/2 of the transmitted frequencies f1 and f2 (the same as the following expressions also).

Further, at this point, the signal processing part 131 of the control processing part 130 may also be made to execute surface condition diagnosis processes based on the amplitude of peak signals existing between the two threshold values for detecting mounting attitude error (above S2 below S1). For example, as the amplitude of peak signals corresponding to the side lobes a1 and a2 increases if there is rugged on the surface, when it is below the first threshold value between the two threshold values for detecting mounting attitude error (above S2 below S1), a warning message may be output indicating that there is such rugged on the surface. Further, as the amplitude of peak signals corresponding to the side lobes a1 and a2 increases if there is water puddle on the surface, when it is above the second threshold value (above S2 below S1) a warning message may be output indicating a caution against slipping.

On the other hand, when the number of peak signals existing between the two threshold values for detecting mounting attitude error (above S2 below S1) is not the same as the number of side lobes a1 and a2, that is to say, when the attitude of the radar 100 for the radar mounted vehicle has varied, the signal processing part 131 of the control processing part 130 calculates the angle θ by which the mounting attitude of the radar 100 is rotated from the standard attitude around a straight axis horizontal to the forward direction of movement of the radar mounted vehicle from the following two expressions (8) and (9).

$$\theta = \cos^{-}\{s1' \cdot c/(2 \cdot fc)\} - \varnothing 1 \quad (8)$$

$$\theta = \cos^{-1}\{s2' \cdot c/(2 \cdot fc)\} - \varnothing 2 \quad (9)$$

The signal processing part 131 of the control processing part 130 outputs the average value of the two angles obtained from the expressions (8) and (9) to the output device 200 as information on the inclination of the radar 100 with respect to the radar mounted vehicle. Further, the signal processing part 131 of the control processing part 130 reads a warning message from the storage part 132 indicating the need for an adjustment of the mounting attitude of the radar and outputs this warning message to the output device 200 together with the information on the inclination of the radar 100. In this way, a warning message indicating the need for an adjustment of the mounting attitude of the radar 100 and information on the inclination of the radar 100 with respect to the radar mounted vehicle are output from the output device 200 in at least one form from among audio and visual output (Step 508). The result is that through this warning message, a user is made aware that the mounting attitude of the radar requires adjustment and is able to recognize, from the information on the inclination of the radar 100 with respect to the radar mounted vehicle, the degree to which mounting attitude of the radar with respect to the radar mounted vehicle has changed from the standard attitude. The work of adjusting the mounting attitude of the radar 100 can then be smoothly performed by tightening the adjusting bolts 142.

Through the execution of the above described processes, a change in the mounting attitude of the radar 100 with respect to the radar mounted vehicle can be detected without adding hardware to a FSK CW radar.

It has been described with respect to this embodiment that a user performs the operation of adjusting the mounting attitude of the radar 100 with respect to the radar mounted vehicle, however it is also suitable to install a motor that rotates the radar 100 around a straight axis horizontal to the forward direction of the radar mounted vehicle and for the microcomputer to control the rotation of the motor to reduce the information on the inclination of the radar 100 with respect to the radar mounted vehicle.

Further, it has been described with respect to this embodiment that a warning message notifying a user that the mounting attitude of the radar requires adjustment is output in at least one of either an audio or visual form, however it is also suitable to notify a user of this information through means such as output of a warning alarm or the flashing of an LED or the like.

Again, it has been described with respect to this embodiment that the frequency of the frequency spectral is made dimensionless, however it does not need necessarily be achieved in this way. For example, it is also suitable to detect the frequency of a peak signal correlated to the main lobe and to use the value for the frequency thus detected to divide the frequency of the frequency spectral. Moreover, in a configuration in which processes to assess the relative attitude of the radar 100 with respect to the radar mounted vehicle are performed only when the speed of the vehicle reaches a predetermined value, it is not necessary to make the frequency of the frequency spectral obtained through FFT processes dimensionless.

Further, in the above description, the upper limit value S1 and the lower limit value S2 for the appropriate frequency region in which peak signals correlated to the side lobes a1 and a2 may exist were fixed, however this is not essential. For example, the appropriate frequency region in which peak signals corresponding to the side lobes a1 and a2 may exist may be changed in coordination to the frequency of peak signals detected in the past as peak signals correlated to the side lobes a1 and a2. The processes performed in such an arrangement are described following with reference to FIG. 9, however the following description covers only those points that are different to those processes described with respect to FIG. 6.

By performing same processes as described above (Steps 500–506), once the peak signals existing between the threshold (above P1 below P2) for detecting the two side lobes are detected, the signal processing part 131 of the control processing part 130 decides whether or not history information on peak signals correlated to the side lobes a1 and a2 exists in the storage part 132 (Step 510).

If the result is that such history information does not exist in the storage part 132 the signal processing part 131 of the control processing part 130 stores frequencies of peak signals detected at Step 506 in the storage part as history information and, by performing the same processes as described above, calculates information measured concerning the target, comprising the relative speeds of the target and the radar 100 and the distance from the radar 100 to the target (Step 509). Thereafter, the signal processing part 131 of the control processing part 130 returns to Step 502 and executes FFT processes in respect of a new sampled signal from the reception part 120.

If on the other hand, history information on peak signals correlated to the side lobes a1 and a2 does exist in the storage part 132, the signal processing part 131 of the control processing part 130 calculates the average value of all history information and calculates the difference between this average value and the frequency of the peak signal obtained at Step 511 (Step 511). The signal processing part 131 of the control processing part 130 then decides whether or not the radar 100 is maintaining the standard attitude by comparing this value for the difference with a predetermined value (Step 512). This is equivalent to making a frequency range of a predetermined bandwidth the center of which is the average value of the history information, the appropriate frequency range within which peak signals correlated to the side lobes a1 and a2 exists.

If, as a result of that comparison, the value for the difference is above the predetermined value, information on the inclination of the radar 100 for the radar mounted vehicle is calculated in the same manner as applies with respect to the above described configuration, and that information is output to the output device 200 together with a warning message indicating that the mounting attitude of the radar requires adjusting (Step 508). On the contrary, if that value for the difference is below the predetermined value however, the signal processing part 131 of the control processing part 130 stores the frequency of the peak signal detected at Step 506 in the storage part as history information (Step 513) and, by performing the same processes as those described above for the purpose, calculates information measured concerning the target, comprising the relative speeds of the target and the radar 100 and the distance from the radar 100 to the target (Step 509). Thereafter, the signal processing part 131 of the control processing part 130 returns to Step 502 and executes FFT processes in respect of a new sampled signal from the reception part 120.

It has been described with respect to this embodiment that when the radar 100 is not maintaining the standard attitude, information on the inclination of the radar 100 with respect to the radar mounted vehicle is output from the output device 200, however, it is also suitable for this information to be preserved as history information together with the time of detection of the frequency of peak signals correlated to the side lobes, and for time-varying of the frequency of peak signals correlated to the side lobes to be output as time-varying of the mounting attitude of the radar 100 with respect to the radar mounted vehicle.

A radar system including a FSK CW radar was provided as an embodiment of the present invention, however radar systems including radar having a modulation system other than a FSK CW radar can also be applied. For example, a radar system including an FMCW radar can also be applied. An example of the present invention applied using a radar system including a homodyne type FMCW radar will now be described, detailing however, only those aspects that are different to the above description concerning the embodiment of present invention using the radar system including a FSK CW radar.

An FMCW radar related to this embodiment of the present invention has the same hardware configuration as the above described FSK CW radar. That is to say, as shown in FIG. 4 this FMCW radar has a transmitting part 110 for emitting radio waves in the forward direction of the radar mounted vehicle, a receiving part 120 for receiving echoes from objects in the forward direction of the radar mounted vehicle, a control processing part 130 which detects an object in the forward direction of the radar mounted vehicle from output from the receiving part 120, as well as a housing (not shown in FIG. 4, refer to FIG. 5) accommodating these parts. In this configuration however, the processes of the transmitting part 110, the receiving part 120 and the control processing part 130 are different to those performed by those parts in the embodiment using the FSK CW radar as described above. Practically, this embodiment is as follows.

At the transmitting part 110, the transmitter 112 repeatedly outputs FM modulated high frequency signals in correlation to triangular wave signals from the modulator 111. This causes radio waves A repeatedly modulated with triangular waves as shown in FIG. 10, to be emitted from the transmitting antenna 113 of the transmitting part 110.

Figure 10:
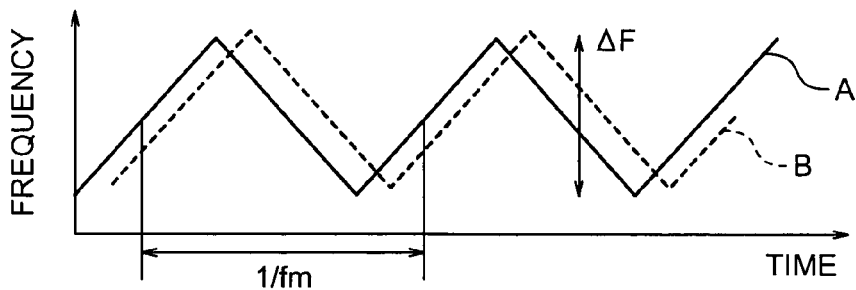
FIG. 10 shows the variation in the frequency of a transmission signal from an FMCW radar.
Figure 11:
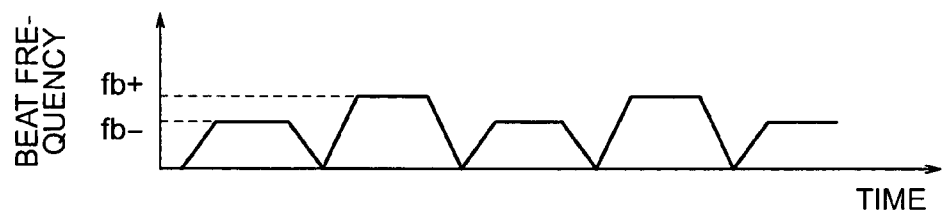
FIG. 11 shows the variation in the frequency of a beat signal obtained by mixing a transmission signal from an FMCW radar and a reflection signal thereof.

If an object exists in the region of radiation of the radio waves, at the receiving part 120, firstly, the receiving antenna 113 receives an echo B from the object as shown in FIG. 10, and the mixer mixes the echoes B and radio waves A from the directionality coupler 14. In this way, a beat signal the frequency of which alternately shows the two values fb+ and fb− at predetermined cycles as shown in FIG. 11 is generated. These beat signals are sampled at determined sampling intervals T by an A/D converter after being demodulated and amplified at an analog circuit 123 at each half cycle of those repeated cycles.

At the control processing part 130, the signal processing part 131 instructs the modulator 112 and the analog circuit 123 on the timing for the folding of the triangular waves, and executes processes to detect information on measurements concerning the target, including the distance from the radar 100 to the target and relative speeds of the radar 100 and the target. In this way the processes depicted in the flowchart of FIG. 13 or the flowchart of FIG. 14 are executed; these processes being different from those illustrated in the flowcharts shown in FIGS. 6 and 9 in the following respects.

Figure 9:
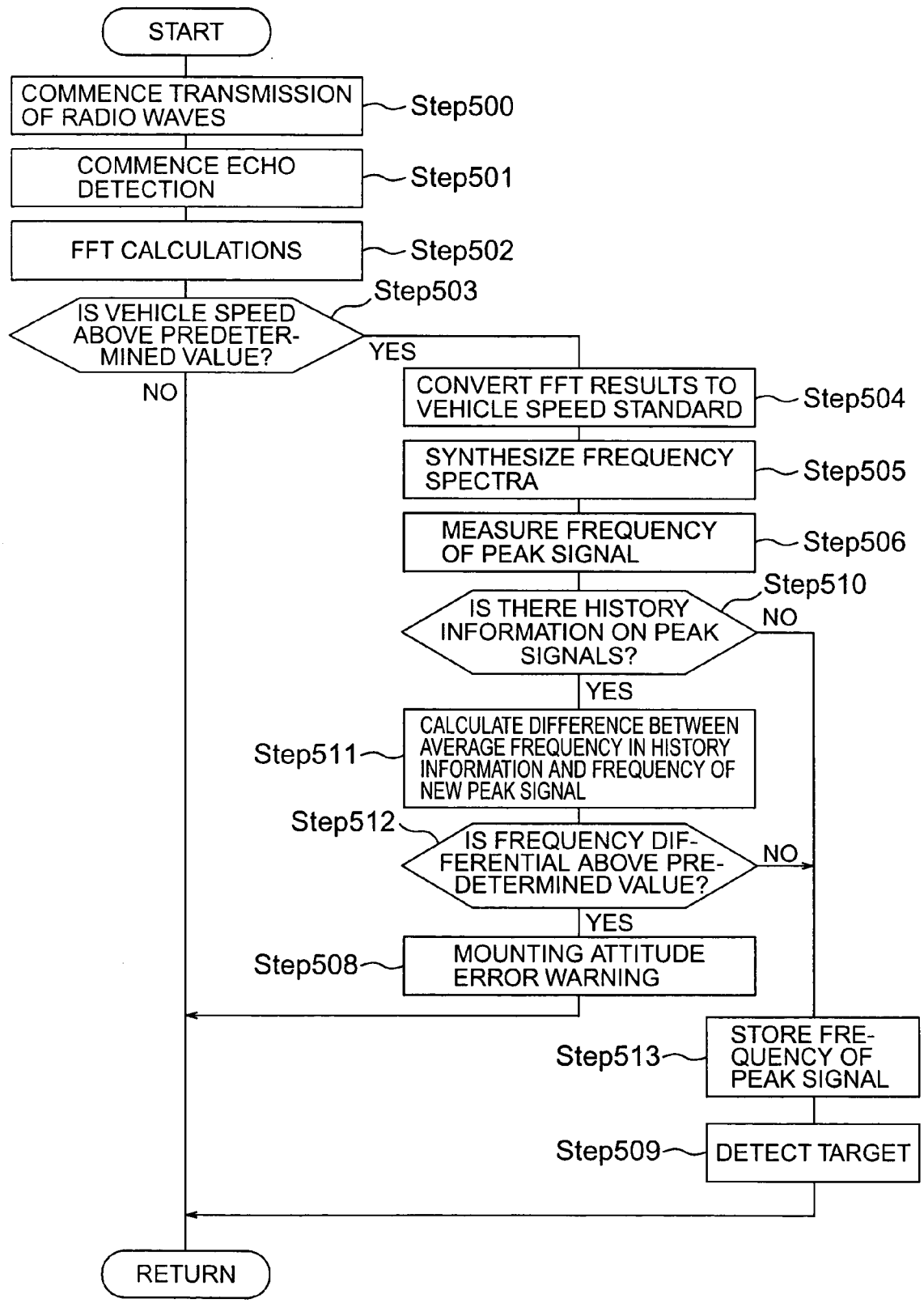
FIG. 9 is a flowchart depicting the processes executed by a microcomputer related to a first embodiment of the present invention.
Figure 12:
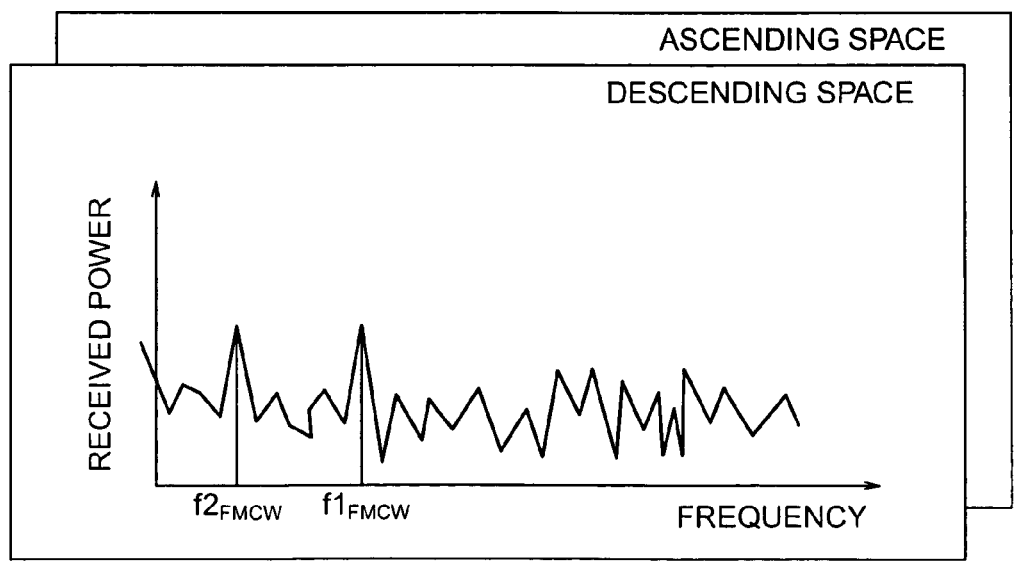
FIG. 12 depicts a frequency spectral generated by FFT.
Figure 13:
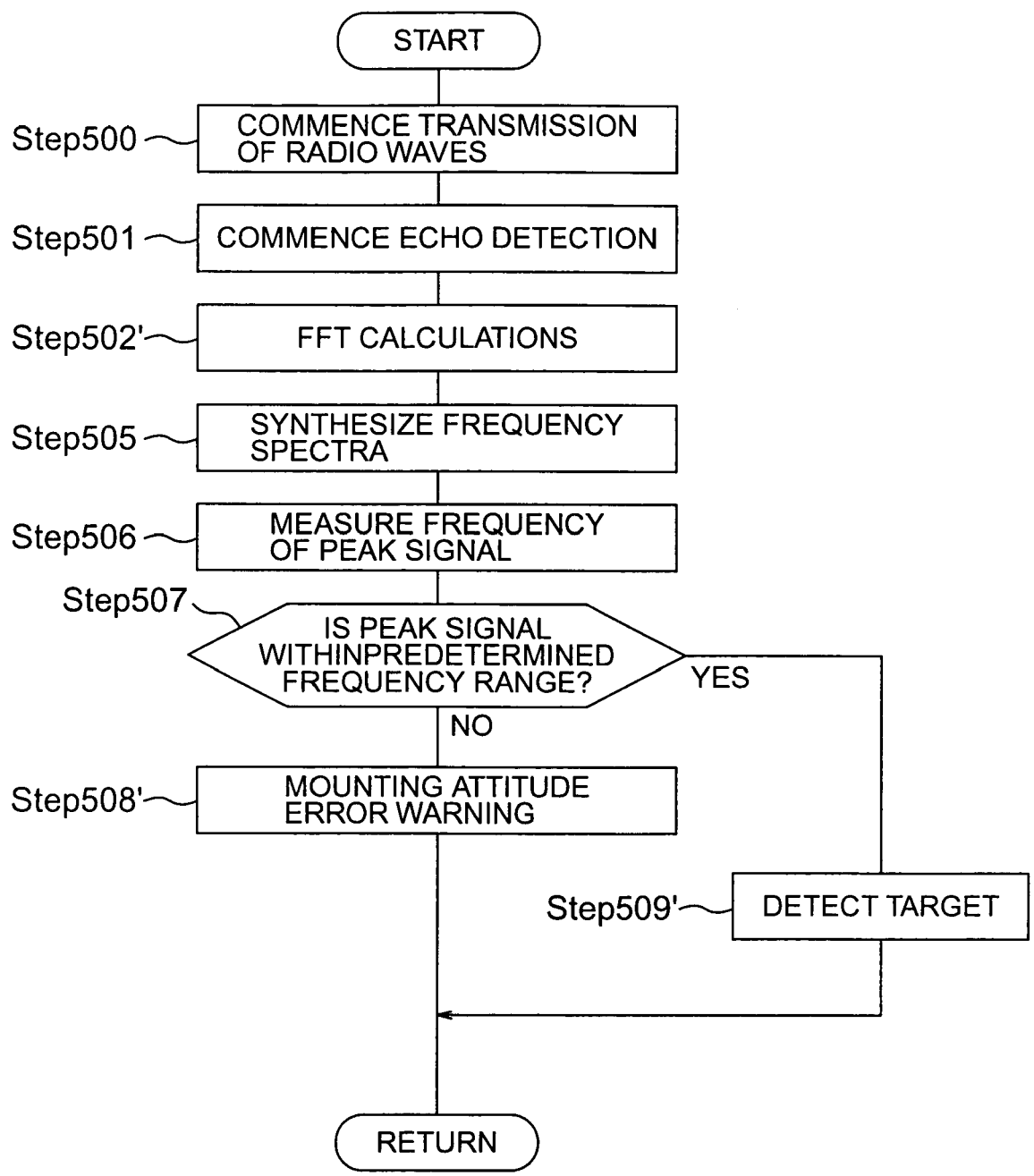
FIG. 13 is a flowchart depicting the processes executed by a microcomputer related to a first embodiment of the present invention.

The FFT processing Step 502' of the flowcharts shown in FIGS. 13 and 14 differs from the FFT processing Step 502 of the flowcharts shown in FIGS. 6 and 9 in the respect that sampled signals from the receiving part 110 decompose into frequency components for each half cycle of the repeated cycles of the beat signals. The frequency spectral obtained by FFT processing Step 502' in the flowcharts of FIGS. 13 and 14 is shown in FIG. 12. In one frequency spectral among the frequency spectra obtained for each half cycle of the cycles of repeated beat signals, a peak signal arises respectively in one frequency f1b+ among the frequencies alternately shown by the beat signals from the echoes from the first side lobe a1 and in one frequency f2b+ among the frequencies alternately shown by the beat signals of the echoes from the second side lobe a2. Further, in the other frequency spectral (not shown in the drawings), a peak signal arises respectively in the other frequency f1b− among the frequencies alternately shown by the beat signals of the echoes from the first side lobe a1 and in the other frequency f2b− among the frequencies alternately shown by the beat signals of the echoes from the second side lobe a2.

Moreover, the flowcharts shown in FIGS. 13 and 14 differ from those shown in FIGS. 6 and 9 in not including the branch process for vehicle speed at Step 503 and the process for making the frequency dimensionless, Step 504, by dividing the frequency by the vehicle speed data. The reason for these differences is that a frequency of a frequency spectral obtained by FFT processes of an FMCW radar does not change in correlation with vehicle speed.

Again, the target detection process 504' of the flowcharts shown in FIGS. 13 and 14 differs from the target detection process 504 of the flowcharts shown in FIGS. 6 and 9 in using the following expressions (10) and (11) for calculation information concerning the target.

$$\text{Range} = c \cdot (fb_{++}fb_{-})/(8 \cdot \Delta F \cdot fm) \tag{10}$$

$$\text{Rate} = \lambda \cdot (fb_{+} - fb_{-})/4 \tag{11}$$

Here, fm is the cycle of repetition of the triangular waves, $\Delta F$ is the bandwidth of the frequency deviation of FM, $\lambda$ is the wavelength of radio waves from the transmitting antenna and fb+ and fb− are frequencies shown by peak signals correlated to the main lobe.

Further, the processes for issuing a warning about an error of the mounting attitude of the radar, Step 508' in the flowcharts shown in FIGS. 13 and 14, differs from the processes for issuing a warning about an error of the mounting attitude of the radar of Step 508 in the flowcharts shown in FIGS. 6 and 9 in using the following expressions (12) and (13) to calculate the attitude of the inclination of the target for the radar mounted vehicle.

$$\theta = \sin^{-1}\{(H/(f1b_{++}f1b_{-}) \cdot (8 \cdot \Delta F \cdot fm/c) - \varnothing 1 \tag{12}$$

$$\theta = \sin^{-1}\{(H/(f2b_{++}f2b_{-}) \cdot (8 \cdot \Delta F \cdot fm/c)\} - \varnothing 2 \tag{13}$$

Here, H is the distance (H of FIG. 2) from the surface to the main lobe when the radar is maintaining the standard attitude, f1b+ and f1b− are the frequency of the peak signal correlated to the first side lobe a1 and the frequency of the peak signal correlated to the second side lobe a2.

The examples above were described envisaging a rolling car type vehicle as the vehicle on which the radar is mounted, however the above radar systems may also be mounted on a two wheeled vehicle or other type of moving body.

Further, in the above descriptions, there are two side lobes concentrated however it is also suitable to have one side lobe. Moreover, three or more side lobes can be used where it is possible to detect beat signals correlated to a still greater number of side lobes.

INDUSTRIAL APPLICABILITY

As described, a radar device related to the present invention enables detection of changes of mounting attitude for a moving body without requiring additional hardware.

The invention claimed is:

1. A radar device mounted on a moving object moving along a continuous plane comprising:
    a transceiver unit which transmits a signal having a main lobe in a direction of movement of said moving object and a side lobe directed toward said continuous plane and for receiving a first reflection signal from a target in a direction of said main lobe and a second reflection signal from said continuous plane in a direction of said side lobe; and
    control processing means which detects a frequency of a beat signal of said second reflection signal received by said transceiver unit and a signal emitted by said transceiver unit and for detecting information correlated to a relative attitude of said radar device for said continuous plane based on said frequency.

2. A radar device mounted on a moving object moving along a continuous plane comprising:
    a transceiver unit which transmits a signal having a main lobe in a direction of movement of said moving object and a side lobe directed toward said continuous plane and for receiving a first reflection signal from a target in a direction of said main lobe and a second reflection signal from said continuous plane in a direction of said side lobe; and control processing means which detects a frequency of a beat signal of said second reflection signal received by said transceiver unit and a signal emitted by said transceiver unit and detects changes in an attitude of said radar device for said continuous plane based on said frequency.

3. A radar device according to either of claims 1 or 2, wherein said control processing means detects a surface condition of said continuous plane based on the strength of a beat signal of said second reflection signal received by said transceiver unit and the signal emitted by said transceiver unit.

4. The radar device of claim 1, further comprising:

output means which outputs a result detected by said control processing means as information showing an attitude of said radar for said moving object.

5. The radar device of claim 2, further comprising:

output means which notifies a change in an attitude of said radar device for said moving object when said control processing means detects a change in mounting attitude of said radar device for said continuous plane.

6. The radar device of claim 3, further comprising:

output means which outputs a notification of a surface condition of said continuous plane detected by said control processing means.

* * * * *